Patented May 1, 1934

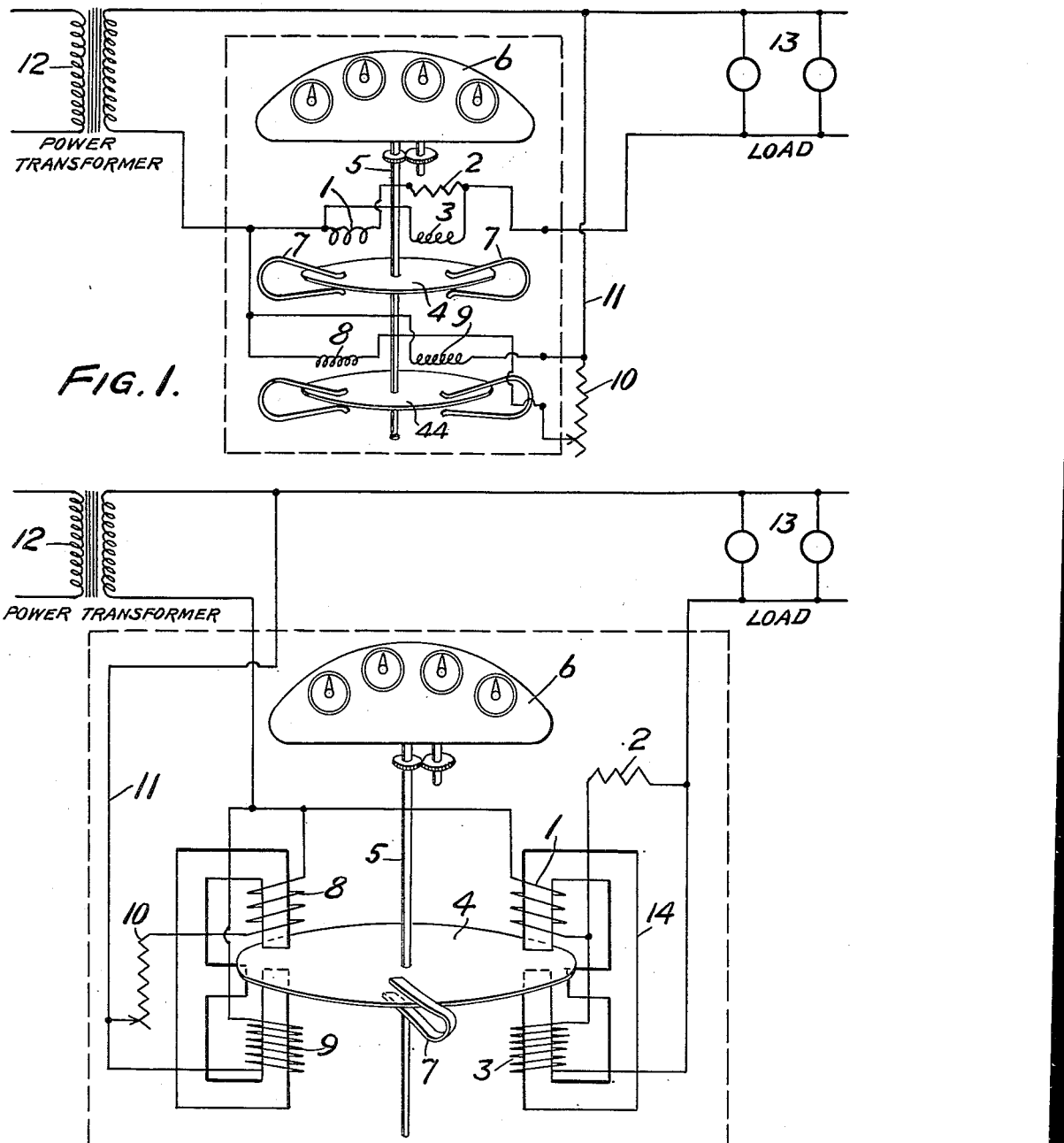

1,957,233

UNITED STATES PATENT OFFICE 1,957,233

COMPENSATING METER

George B. Schleicher, Clementon, N. J.

Original application September 30, 1931, Serial No. 565,937. Divided and this application October 16, 1933, Serial No. 693,819

3 Claims. (Cl. 175—183)

This invention relates to a system of measurement comprising an integrating and/or indicating measuring device for determining energy losses in power transformers used for supplying the customers of electrical utilities, transmission lines, distribution systems or substations or for other purposes.

In electrical metering practice it is often economically advisable to measure energy consumption on one side (either primary or secondary) of a transformer, and to add or subtract, as the case may require, a calculated value of transformer losses. Losses calculated on the basis of the average load give a value which is less than the true value if the load at times varies from the average; and when load variations are taken into consideration, the calculations become cumbersome.

One object of this invention is to provide an integrating meter whose registration will be proportional at all loads to the losses within the transformer, and whose readings at desired time intervals will represent the energy losses in the transformer during the period.

Another object of the invention is to provide, in combination with a standard watt hour meter, registering output of a transformer on the secondary side, a means of recording electrical input to the primary side. The latter object is prompted by the limitations of present commercial watt hour meters when installed on the primary side, in recording accurately the energy losses in transformers at times of no load or when the load on the transformer is small. Since the transformer losses are usually of the order of from 1 to 2% of the full load rating, commercial watt hour meters suitable for measuring the total load may record the losses alone with considerable error.

A third object of the invention is to make possible and commercially practical the increased factor of safety which is obtainable from low-tension metering equipment as compared to metering on the high-tension side. Particularly in the smaller current ratings, high-tension current transformers of the accuracy requirements suitable for metering have thermal and mechanical limits which are less than those of other equipment installed at equally exposed locations on transmission and distribution systems.

In practising the invention, use is made of the principle of the induction watt hour meter. For purposes of measurement, the losses are considered in two parts, viz: (1) copper losses, which vary with the square of the load current, and (2) iron losses, which vary with the square of the applied voltage.

For a further exposition of my invention, reference may be had to the annexed drawing and specification at the end whereof my invention will be specifically pointed out and claimed.

In the drawing:

Fig. 1 is a diagrammatic view showing one modification of my device; and

Fig. 2 is a diagrammatic view showing another modification of my device.

This application is a division of my co-pending application filed September 30, 1931, under Serial No. 565,937.

For the measurement of copper losses, the principle of the ampere-square-hour meter is utilized, and with certain changes either element of a two-element induction watt hour meter may be adapted for this purpose. In Fig. 1, the top element is arranged with a current coil 1 which consists of a number of turns of heavy wire connected in series with a resistor 2 which is in turn connected in series with the load current. The potential coil 3 also consists of a number of turns of heavy wire, and its terminals are connected across the terminals of current coil 1 and resistor 2 which serve as a shunt. The magnetic effect of each coil is thus proportional to the load current, and their interaction will produce a torque on disk 4 which varies with the square of the load current.

The disk 4 is mounted on shaft 5 suitably geared to register 6 in accordance with the usual arrangement of watt hour meters, and one or more permanent magnets 7 serve to provide an adjustable retarding torque. The register gearing is advantageously, but not necessarily, chosen to record in ampere-square-hours. In using the indication of the meter, the reading is multiplied by a constant, and when the register is geared to read ampere-square-hours, the constant is equal to the equivalent effective resistance of the transformer in ohms.

The foregoing description applies to that part of the meter whose registration is proportional to the copper losses, and originality in regard to this part is claimed only in combination with the core-loss element described below.

The other element of the combination, the lower element in Fig. 1, consists of a current electromagnet 8 and a potential electromagnet 9 operating on a second disk 44 connected to shaft 5. The potential electromagnet 9 is the standard potential coil as used in a watt hour meter designed for the voltage of the circuit to which the "compensating meter" is connected. The current electromagnet 8 may be a standard watt hour meter current coil, but it is advantageous to construct this coil of a larger number of turns, so that the full load speed of the lower element may be obtained with a current as small as 0.1 ampere or less. An adjustable resistor 10 is connected, either within the meter or externally, between the load terminal of current coil 8 and the opposite side of the line 11. The value in ohms of resistor 10 is adjusted on the basis of the magnitude of the core losses, the register ratio of the meter, and the current required to cause the lower element to record the true core losses on register 6 in connection with the constant established for the copper loss registration on the copper-loss element.

In practising the invention, it is evident that as soon as the transformer 12 is energized even though load 13 is not connected, the meter will immediately begin to record due to the torque produced by the lower element, and the amount of registration will depend upon the magnitude of the core losses and the time that the transformer is energized. If now load 13 is connected in circuit, the upper element will add a torque in proportion to the copper losses and the total losses will be integrated with respect to time on register 6. Variations in load 13 vary the torque added by the copper-loss element automatically, and the resultant registration of the meter as a whole will be proportional to the transformer losses over a desired period of time.

Variations in general design and arrangement of the various parts are possible and this invention includes the application of the principles involved with respect to all types of integrating induction meters. Resistors 2 and/or 10 may be within the case of the meter or may be mounted and connected externally. Register 6 may be of the cyclometer type if desired, and while Fig. 1 shows two permanent magnets per element, the invention is equally applicable for single magnet construction, or with the omission of the magnet or magnets from either element.

The compensating meter serves also for the measurement of the maximum loss demand. This is accomplished by replacing register 6 with a standard watt hour demand register, by adding contacts for the operation of a separate demand meter, or by adding a graphic demand mechanism. No originality is claimed for these accessories, and they are cited only to indicate their part in the system of measurement described herein.

Alternative arrangements and connections to those shown in detail in Fig. 1 are possible, and it is intended to include any other connections and meter arrangements which permit the combination of a "current squared" element and a "voltage squared" element on a single shaft and/or driving a single register.

Fig. 2 uses the same connections as in Fig. 1 of my co-pending application Ser. No. 565,937, but differs in that the "voltage squared" element and the "current squared" element actuate the same disk. This is possible by placing the two elements, each in operative relation to, but at opposite ends of the disk. This figure shows the single phase form, and when two disks with a single shaft and register are used, a polyphase meter results. When three disks and three sets of elements are mounted to co-act on a single shaft and driving a single register, a polyphase loss meter suitable for unbalanced three-phase four-wire circuits is obtained.

Calibration of the meter is effected in two operations. The copper-loss element is checked with an ammeter and adjustment is possible by adjusting the retarding torque of the permanent magnets on either or both elements of the meter. The core loss element should be excited at normal voltage during this test, and its effect is subtracted from the total to determine the accuracy of the copper-loss element.

The constant for the meter is the equivalent effective resistance of the transformer and is determined from copper loss tests on the transformer. The constant may be included wholly or in part in the register ratio, and the register reading with its multiplier will then be in kilowatt hours.

The original adjustment of the core-loss element is by adjusting resistor 10 so that the registration on the register will represent the kilowatt hours due to core loss, the value of which has been determined from tests on the transformer. Subsequent checks require only the timing of the disk to verify that no changes in calibration have occurred.

The compensating meter may be connected to the secondaries of instrument transformers when the characteristics of the circuit make this procedure advisable. Fig. 3 of my co-pending application Serial No. 565,937 serves as an example of this connection and shows the compensating meter connected to current and potential transformers on a single phase circuit.

Certain refinements are possible when it is desired to obtain precision accuracy of performance, in which case the resistors 10 and 2 may be made of suitable metals so that their temperature coefficients will introduce the desired variables to compensate for changes in transformer temperatures, and for specific installations it is possible to make the register direct-reading by including the constant in the register ratio.

The invention is shown in Fig. 1 in the single-phase form, suitable for measuring the losses of a single transformer or the total losses on polyphase transformer banks carrying balanced loads and operating at balanced voltages. On unbalanced polyphase circuits, duplicates of the combination shown may be provided, or the several combinations may be combined in a multi-element meter, either with two shafts and a differential register, or a single shaft.

I do not intend to be limited in the practice of my invention save as the scope of the prior art and of the attached claims may require.

I claim:—

1. In an electric system, the combination of a transformer, an electric meter for measuring the losses of said transformer, said meter including in combination, means for integrating the losses in said transformer, a shaft for driving said means, a disk attached to said shaft, a coil in operative relation to said disk through which coil a current proportional to the current of said transformer passes, a resistor connected in series with said coil, a second coil connected in parallel with said first coil and said resistor in series and arranged in operative relation to said disk, the effect of said coils on said disk being proportional to the square of the current of the transformer, a second disk on said shaft, a third coil in operative relation to said second disk and responsive to the voltage of said transformer, a fourth coil in operative relation to said second disk, a second resistor connected in series with said fourth coil across said transformer, the effect of said third and fourth coils on said second disk being proportional to the square of the voltage of said transformer, and means for adjusting the effective torques of said elements to desired values.

2. In an electric system, the combination of a transformer, an electric meter for measuring the losses of said transformer, said meter comprising in combination, means for integrating the losses in said transformer, a shaft for driving said means, a disk attached to said shaft, a coil through which a current proportional to the current of said transformer passes, a second coil through which a current proportional to the current of said transformer passes, means for providing a suitable phase displacement between the fluxes of said coils, said coils being in operative relation to said disk, third and fourth coils in operative relation to said disk and responsive to the voltage of said transformer, and means for calibrating said first and second coils and said third and fourth coils in accordance with perdetermined core and copper losses in said transformer.

3. In an electric system, the combination of a transformer, an electric meter for measuring the losses of said transformer, said meter comprising in combination, means for integrating the losses in said transformer, a shaft for driving said means, disk means attached to said shaft, a coil through which a current proportional to the current of said transformer passes, a second coil through which a current proportional to the current of said transformer passes, means for providing a suitable phase displacement between the fluxes of said coils, said coils being in operative relation to said disk means, third and fourth coils in operative relation to said disk means and responsive to the voltage of said transformer, and means for calibrating said first and second coils and said third and fourth coils in accordance with predetermined core and copper losses in said transformer.

GEORGE B. SCHLEICHER.